United States Patent
Shao-Horn et al.

(10) Patent No.: US 10,553,866 B2
(45) Date of Patent: Feb. 4, 2020

(54) ELECTROCHEMICAL METHODS AND SYSTEMS USING CATALYTIC MATERIALS

(75) Inventors: Yang Shao-Horn, Cambridge, MA (US); Kevin May, Ancaster (CA); Jin Suntivich, Bangkok (TH)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 332 days.

(21) Appl. No.: 13/185,939

(22) Filed: Jul. 19, 2011

(65) Prior Publication Data

US 2013/0020207 A1 Jan. 24, 2013

(51) Int. Cl.
*H01M 4/485* (2010.01)
*C25B 1/04* (2006.01)
*C25B 11/04* (2006.01)

(52) U.S. Cl.
CPC ............... *H01M 4/485* (2013.01); *C25B 1/04* (2013.01); *C25B 11/0463* (2013.01)

(58) Field of Classification Search
CPC ............. H01M 4/9033; C25B 11/0463; C25B 1/02–1/12
See application file for complete search history.

(56) References Cited

U.S. PATENT DOCUMENTS 4,497,698 A * 2/1985 Bockris ............... C25B 1/04 204/242
2007/0292744 A1* 12/2007 Lopez ............... B01J 23/468 429/418

OTHER PUBLICATIONS

Mawdsley et al., Materials Development for Improved Efficiency of Hydrogen Production by Steam Electrolysis and Thermochemical-Electrochemical Processes, Proc. AIChE (2005).*
Lim et al., Pd-Pt Bimetallic Nanodendrites with High Activity for Oxygen Reduction, 324 Science 1302 (Year: 2009).*
Suntivich et al., Design principles for oxygen-reduction activity on perovskite oxide catalysts for fuel cells and metal-air batteries, 3 Nature Chem. 546 (Year: 2011).*
International Search Report and Written Opinion of the International Searching Authority dated Oct. 19, 2012 for PCT/US2012/047264.
Zhuang et al., "Preparation of silver-modified LaCaCoObinary electrocatalyst for bi-functional air electrodes in alkaline medium," Journal of Power Sources, vol. 196, No. 8, Nov. 9, 2010; pp. 4019-4025.
Vermeiren et al., "Oxygen evolution on La0.8Sr0.2Ni0.2Co0.803 electrocatalysts in alkaline medium," International Journal of Hydrogen Energy, Elsevier Science Publishers B.V., Barking, GB, vol. 12, No. 7, Jan. 1, 1987, pp. 469-472.
Chang et al., "Synthesis of La0.6Ca0.4Co0.8Ir0.2O3 perovskite for bi-functional catalysis in an alkaline electrolyte," Journal of Power Sources, vol. 189, No. 2, Apr. 15, 2009, pp. 1003-1007.

(Continued)

*Primary Examiner* — Brian W Cohen
*Assistant Examiner* — Ho-Sung Chung
(74) *Attorney, Agent, or Firm* — Steptoe & Johnson LLP

(57) ABSTRACT

The oxygen evolution reaction (OER)-catalyzing activity of transition metal perovskite oxide catalysts depends on the occupancy of the σ-bonding orbital of $e_g$ symmetry parentage of the active cation. Catalysts having preferred values of $e_g$ orbital filling can have a high intrinsic activity for catalysis of the OER.

8 Claims, 7 Drawing Sheets

(56) References Cited

OTHER PUBLICATIONS

Tiwari et al., "Electrolocatalysis of oxygen evolution/reduction on $LaNiO_3$ prepared by a novel malic acid-aided method," Journal of Applied Electrochemistry, vol. 28, No. 1, Jan. 1, 1997, pp. 114-119.
Bo et al., "Microstructural characterization and electrochemical properties of Ba0.5Sr0.5Co0.8Fe0.2O3-delta and its application for anode of SOEC," International Journal of Hydrogen Energy, Elsevier Science Publishers B.V., Barking, GB, vol. 33, No. 23, Dec. 1, 2008, pp. 6873-6877.
International Preliminary Report on Patentability dated Jan. 21, 2014, issued in International Application No. PCT/US2012/047264.
Bockris, JOM and Otagawa, J. Electrochem. Soc., vol. 131, No. 2, 290-302 (1984).

\* cited by examiner

ELECTROCHEMICAL METHODS AND SYSTEMS USING CATALYTIC MATERIALS

STATEMENT REGARDING FEDERALLY SPONSORED RESEARCH OR DEVELOPMENT

This invention was made with government support under Grant No. DE-FG02-05ER15728, awarded by the Department of Energy. The government has certain rights in this invention.

TECHNICAL FIELD

This invention relates to electrochemical methods and systems using catalytic materials, e.g., for catalysis of the oxygen evolution reaction.

BACKGROUND

Hydrogen gas and metal-air batteries exhibit many advantages as a carbon-free energy storage medium. Both have the highest energy density by mass of all energy storage technologies. The hydrogen gas may be readily formed in a sustainable fashion via the electrolysis of water powered by renewable energy, and metal-air batteries may also be charged by an application of renewable electricity. Widespread adoption of hydrogen fuels and metalair batteries depends on control over electron transfer reactions, in particular the oxygen evolution reaction (OER), written as:

$$2H_2O \rightarrow O_2 + 4H^+ + 4e^- \tag{1}$$

in the case of low pH water electrolysis, or written as:

$$4OH^- \rightarrow O_2 + 2H_2O + 4e^- \tag{2}$$

in the case of high pH water electrolysis, or lastly as:

$$M_xO_y \rightarrow (y/2)O_2 + xM^{(2y/x)+} + 4e^- \tag{3}$$

in the case of metal-air batteries, all of which occur at catalyst surfaces. For (1) and (2), the OER occurs in solar-driven water splitting or an electrolyzer, using electricity to produce hydrogen and oxygen gases. For (3), the OER occurs in an electricity-driven charging of metal-air batteries, using electrical power to form a reduced form of metal and/or metal oxides, and oxygen gases.

Well-known catalysts for the OER include expensive precious metals and precious metal oxides, for example $IrO_2$. However, the prohibitive cost and scarcity of precious metal elements limit their usage in practical applications. First-row transition-metal oxides (such as $NiCo_2O_4$ and cobalt-phosphate-based catalysts) offer alternative solutions, but can be less active than $IrO_2$.

SUMMARY

The activity of transition metal perovskite oxide catalysts for the OER can have a volcano relationship with the occupancy of the σ-bonding orbital of $e_g$ symmetry parentage on the active cation redox couple. In other words, the activity increases with the occupancy of the σ-bonding orbital of $e_g$ symmetry parentage until certain $e_g$ value is reached, in which the activity switches to decrease with further increment of $e_g$ value. This so-called volcano dependence can guide identification of oxide catalysts, which have a Fermi energy near the top of the O-2p bands for these reactions. This principle has been applied in the design of OER electrocatalysts with an intrinsic OER activity (specific activity) higher than that of $IrO_2$. The perovskite $Ba_{0.5}Sr_{0.5}Co_{0.8}Fe_{0.2}O_{3-\delta}$ in particular can have both a specific and a mass OER activities that is higher than that of $IrO_2$.

In one aspect, an electrochemical system includes a voltage source electrically connected to a first electrode and a second electrode, and an electrolyte in contact with the first electrode and the second electrode, where the second electrode includes a catalyst of formula (I):

$$A_xA'_{1-x}B_yB'_{1-y}O_{3\pm\delta} \tag{I}$$

where each of A and A', independently, is a rare earth or alkaline earth metal, x is in the range of 0 to 1, each of B and B', independently, is a transition metal, y is in the range of 0 to 1, and δ is in the range of 0 to 1, and where the system is configured such that the catalyst catalyzes the oxygen evolution reaction when an oxygen-generating voltage is applied across the first electrode and the second electrode.

In another aspect, a method of making an electrochemical system includes determining the occupancy of the σ-bonding orbital of $e_g$ symmetry parentage of B, B', or each of B and B' for a plurality of different materials of formula (I):

$$A_xA'_{1-x}B_yB'_{1-y}O_{3\pm\delta} \tag{I}$$

where each of A and A', independently, is a rare earth or alkaline earth metal, x is in the range of 0 to 1, each of B and B', independently, is a transition metal, y is in the range of 0 to 1, and δ is in the range of 0 to 1; selecting from the plurality a particular material of formula (I) where the occupancy of the σ-bonding orbital of $e_g$ symmetry parentage of B, B', or each of B and B', is in the range of 0 to 2; and making an electrode including the selected material of formula (I).

In another aspect, a method of generating oxygen includes providing a voltage source electrically connected to a first electrode and a second electrode; and an electrolyte in contact with the first electrode and the second electrode; wherein the second electrode includes a catalyst of formula (I):

$$A_xA'_{1-x}B_yB'_{1-y}O_{3\pm\delta} \tag{I}$$

where each of A and A', independently, is a rare earth or alkaline earth metal, x is in the range of 0 to 1, each of B and B', independently, is a transition metal, y is in the range of 0 to 1, and δ is in the range of 0 to 1; and where the system is configured such that the catalyst catalyzes the oxygen evolution reaction when an oxygen-generating voltage is applied across the first electrode and the second electrode; and applying the oxygen-generating voltage across the first electrode and the second electrode.

The catalyst can include a perovskite. At least one of A or A' can be La; and in some cases, the other of A and A' is Ca. A can be Ba and A' can be Sr. B can be Co. B' can be Fe. The catalyst can have the formula $Ba_{0.5}Sr_{0.5}Co_{0.8}Fe_{0.2}O_{3-\delta}$. The occupancy of the σ-bonding orbital of $e_g$ symmetry parentage of B, B', or each of B and B', can be in the range of 0 to 2, can be in the range of 0.8 to 1.5; or can be approximately 1.2.

Other aspects, embodiments, and features will be apparent from the following description, the drawings, and the claims.

DETAILED DESCRIPTION

Figure 1A:
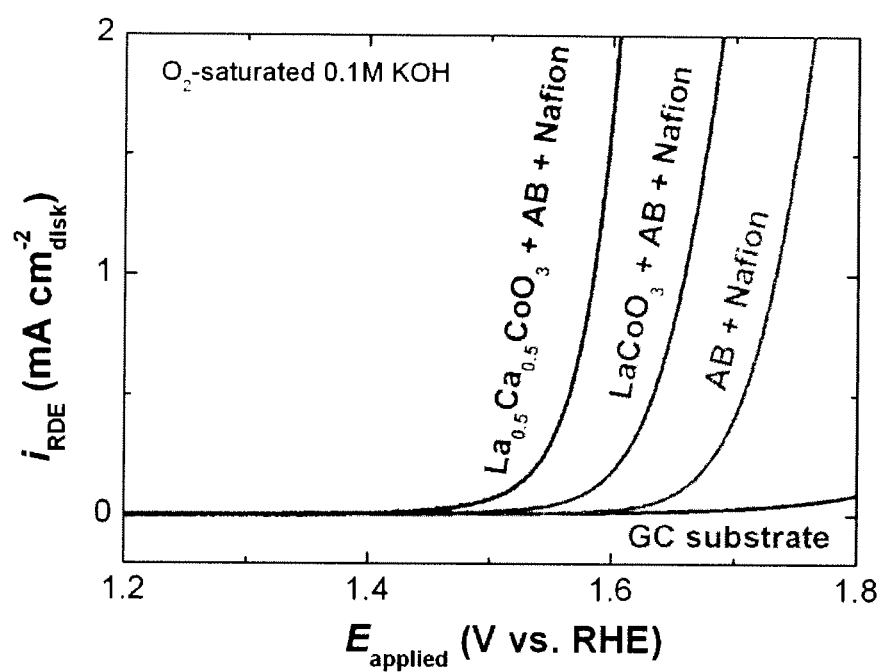
FIG. 1A is a graph showing geometric OER activity of oxides, and background anodic currents for comparison.

Compositions, electrodes, systems, and methods for carrying out the OER and other electrochemical techniques are described. The compositions, electrodes, and systems can include catalytic materials, typically used for hydrogen/oxygen generation or metal formation, where the catalytic material includes an oxide. In some cases, the oxide can be a perovskite oxide. The systems can operate with improved activity, e.g., at low absolute value of the overpotential, high current density, significant efficiency, stability, or a combination of these. The catalytic materials can also be free of expensive precious metals or precious metal oxides. The systems also can operate at or higher than neutral pH, without necessarily requiring highly pure solvent sources, or any combination. The compositions, electrodes, systems, and methods are useful in applications such as energy storage, energy use, and production of hydrogen and/or oxygen gases.

Although the compositions, electrodes, systems, and methods described are primarily related to the OER, they are not limited in this way. Where a system is described as involving a first electrode and/or a second electrode (one or both of which can include a catalytic material), with production of oxygen gas via water electrolysis at the first electrode and/or production of hydrogen gas at the second electrode, it is to be understood that the first electrode can facilitate oxidation of water or another species to produce oxygen gas or another oxidized product. Examples of reactants that can be oxidized in this context can include methanol, formic acid, ammonia, etc. Examples of oxidized products can include CO$_2$, N$_2$, etc. At the second electrode, a reaction can be facilitated in which water (or hydrogen ions) is reduced to make hydrogen gas, but it is to be understood that a variety of reactants not limited to water (e.g., metal oxides or ions, acetic acid, phosphoric acid, etc.) can be reduced to form hydrogen gas and/or metals and/or other products of the reduction reaction (e.g., metal hydroxides, acetate, phosphate, etc.). This reaction at the second electrode can be run in reverse, in "fuel cell" operation, such that hydrogen gas (and/or other exemplary products noted above) is oxidized to form water (and/or other exemplary reactants noted above). In some cases, the compositions, electrodes, methods, and/or systems may be used for reducing hydrogen gas. In some cases, the compositions, electrodes, methods, and/or systems may be used in connection with a photoelectrochemical cell.

Electrolytic devices, fuel cells, and metal-air batteries are non-limiting examples of electrochemical devices provided herein. Energy can be supplied to electrolytic devices by photovoltaic cells, wind power generators, or other energy sources.

Electrolysis refers to the use of an electric current to drive an otherwise non-spontaneous chemical reaction. For example, electrolysis involves a change in redox state of at least one species, and/or formation and/or breaking of at least one chemical bond, by the application of an electric current. Electrolysis of water generally involves splitting water into oxygen gas and hydrogen gas, or oxygen gas and another hydrogen-containing species, or hydrogen gas and another oxygen-containing species, or a combination. In some embodiments, the systems described herein are capable of catalyzing the reverse reaction. That is, a system can be used to produce energy from combining hydrogen and oxygen gases (or other fuels) to produce water.

A power source may supply DC or AC voltage in an electrochemical system. Non-limiting examples include batteries, power grids, regenerative power supplies (e.g., wind power generators, photovoltaic cells, tidal energy generators), generators, and the like. The power source can include one or more such power supplies (e.g., batteries and a photovoltaic cell). In a particular embodiment, the power supply can be one or more photovoltaic cells. In some cases, an electrochemical system may be constructed and arranged to be electrically connectable to and able to be driven by a photovoltaic cell (e.g., the photovoltaic cell may be the voltage or power source for the system). Photovoltaic cells include a photoactive material, which absorbs and converts light to electrical energy.

An electrochemical system may be combined with additional electrochemical system to form a larger device or system. This may take the form of a stack of devices or subsystems (e.g., fuel cell and/or electrolytic device and/or metal-air battery) to form a larger device or system.

Various components of a device, such as the electrodes, power source, electrolyte, separator, container, circuitry, insulating material, gate electrode, etc. can be fabricated by those of ordinary skill in the art from any of a variety of components, as well as those described in any of those patent applications described herein. Components may be molded, machined, extruded, pressed, isopressed, infiltrated, coated, in green or fired states, or formed by any other suitable technique. Those of ordinary skill in the art are readily aware of techniques for forming components of devices herein.

Discovery of cost-effective, high-performing catalysts made from cheap, abundant elements is essential for widespread implementation of renewable energy. See Norskov, J. K., et al., *Nature Chem.* 1, 37-46 (2009), which is incorporated by reference in its entirety. For hydrogen fuels, the (OER) in solar-driven water splitting or an electrolyzer is the central efficiency-limiting process (see, for example, Gray, H. B., *Nature Chem.* 1, 7 (2009); and Khaselev, O. & Turner, J. A., *Science* 280, 425-427 (1998); and Kanan, M. W. & Nocera, D. G., *Science* 321, 1072-1075 (2008); each of which is incorporated by reference in its entirety). Similarly, the ORR is efficiency-limiting in hydrogen fuel cells (see, e.g., Gasteiger, H. A. & Markovic, N. M., *Science* 324, 48-49 (2009); and Stamenkovic, V. R. et al., *Science* 315, 493-497 (2007); each of which is incorporated by reference in its entirety). Each of these reactions contributes significant loss (several hundreds of millivolt), despite being facilitated by expensive precious metal and precious metal-oxide catalysts in all pH ranges. See Gasteiger, H. A., et al., *Appl. Catal., B* 56, 9-35 (2005); and Kinoshita, K., *Electrochemical Oxygen Technology*, 1 ed. (Wiley-Interscience, 1992); each of which is incorporated by reference in its entirety. The limitation of the ORR and the OER kinetics also applies, but is not limited to metal-air battery technologies.

Among the known precious metal oxide catalysts, $IrO_2$ has the highest OER activity, providing specific activity of ~500 $\mu A\ cm^{-2}_{ox}$ and mass activity of ~200 A/g at 0.4 V overpotential (see, e.g., Rasten, E., Hagen, G., & Tunold, R., *Electrochim. Acta* 48, 3945-3952 (2003), which is incorporated by reference in its entirety). Transition-metal oxides such as $NiCo_2O_4$ catalyst demonstrate a specific activities of ~60 $\mu A\ cm^{-2}_{ox}$ (~30 A/g) (see Table 1 and Rasten, E., Hagen, G., & Tunold, R., *Electrochim. Acta* 48, 3945-3952 (2003); Burke, L. D., Murphy, O. J., Oneill, J. F., & Venkatesan, S., *J. Chem. Soc. Faraday Trans.*, 73, 1659-1671 (1977); Davidson, C. R., Kissel, G., & Srinivasan, S., *J. Electroanal. Chem.* 132, 129-135 (1982); and Gasteiger, H. A., Kocha, S. S., Sompalli, B., & Wagner, F. T., *Appl. Catal., B* 56, 9-35 (2005); each of which is incorporated by reference in its entirety. The OER activities at 0.4 V overpotential are displayed in comparison in Table 1, where the listed values were ohmic corrected, and normalized to the catalyst specific area following the methodology as described in Suntivich, J., et al., *J. Electrochem. Soc.* 157, B1263-B1268 (2010), which is incorporated by reference in its entirety.

TABLE 1

| Compounds (electrolyte) | Electrode i (mA $cm^{-2}_{disk}$) | Loading (per $cm^{-2}_{disk}$) | Mass i (A $g^{-1}$) | Specific i ($\mu A\ cm^{-2}_{ox}$) |
|---|---|---|---|---|
| $NiCo_2O_4$ (30 w/o KOH) | ~300 | 10 $mg_{NiCo2O4}$ | ~30 | ~60 |
| $IrO_2$ (0.1M KOH) [Note: this work] | ~18 | 0.05 $mg_{IrO2}$ | ~360 | ~500 |
| $RuO_2$ (0.1M KOH) [Note: this work] | ~5 | 0.05 $mg_{RuO2}$ | ~100 | ~100 |
| BSCF (0.1M KOH) [Note: this work] | ~100 | 0.25 $mg_{BSCF}$ | ~500 | ~20,000 |

Discovery of new OER electrocatalysts that can compete against precious metal oxides can benefit from a "design principle" that links material structure and chemistry to catalytic activity. Sabatier's principle provides a qualitative rationale that the best catalyst must bind to the intermediate neither too strongly nor too weakly. This has been demonstrated experimentally for the relationship between the OER activity and the enthalpy of a lower to higher oxide transition (see Trasatti, S., *J. Electroanal. Chem.* 111, 125-131 (1980); which is incorporated by reference in its entirety). However, it is not straightforward to discover or predict new transition-metal oxides with high OER activity based only on correlation. With the exception of cobalt-phosphate-based catalysts (see, e.g., Kanan, M. W. & Nocera, D. G., *Science* 321, 1072-1075 (2008); and Esswein, A. J., Surendranath, Y., Reece, S. Y., & Nocera, D. G., *Energy Environ. Sci.* 4, 499-504 (2011); each of which is incorporated by reference in its entirety), very few new oxides with high OER activity have been reported.

Generally speaking, an electrochemical system includes two electrodes (i.e., an anode and a cathode) in contact with an electrolyte. The electrodes are electrically connected to one another; the electrical connection can, depending on the intended use of the system, include a power source (when the desired electrochemical reactions require electrical energy) or an electrical load (when the desired electrochemical reactions produce electrical energy). An electrochemical system can be used for producing, storing, or converting chemical and/or electrical energy.

Figure 6:
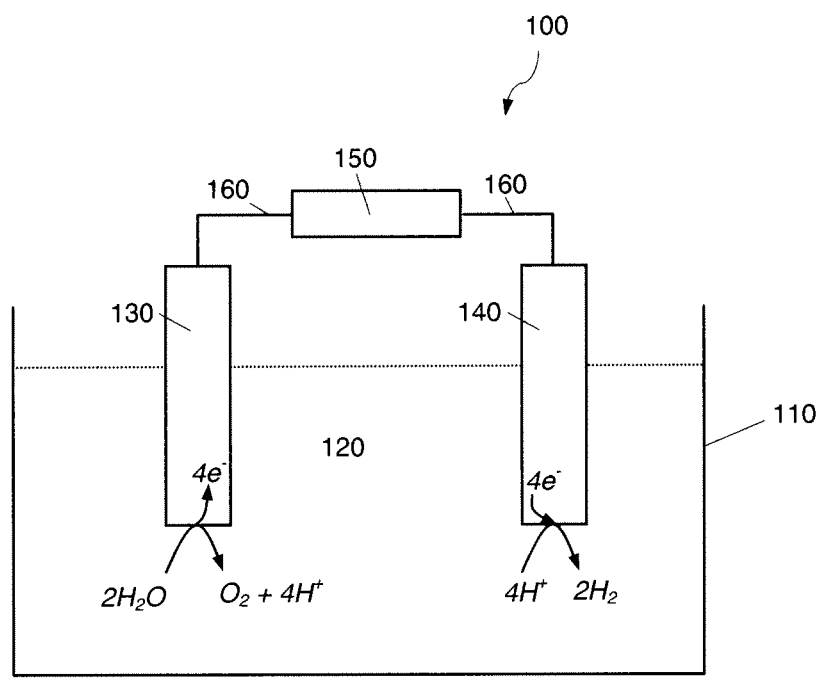
FIG. 6 schematically illustrates an electrochemical system.

FIG. 6 schematically illustrates electrochemical system 100, which includes vessel 110 containing an electrolyte 120. First electrode 130 and second electrode 140 are each in contact with electrolyte 120. FIG. 6 shows the system configured for electrolysis of water, however other configurations of a general electrochemical system are possible. For example, an electrochemical system can include a fuel cell, where hydrogen gas and oxygen gas are converted to water and electricity, which can be used to drive an electrical load.

Electrodes 130 and 140 can each individually include a catalytic material; in particular, in the configuration shown, electrode 130 can include a catalyst effective for catalyzing the OER. Power source 150 is connected by electrical connectors 160 to electrodes 130 and 140. In this way, power source 150 can supply a potential difference between electrodes 130 and 140. At certain values of the potential difference, the reactions shown can occur, including the OER at electrode 130. In the configuration illustrated, hydrogen gas can be produced at electrode 140.

Further details of devices and systems, including details of electrode construction, are known in the art. In this regard, see, for example, US Patent Application Publication Nos. 2011/0048962, 2010/0028746, and 2009/0068541, each of which is incorporated by reference in its entirety.

Catalytic materials useful in electrochemical systems can have the formula (I):

$$A_xA'_{1-x}B_yB'_{1-y}O_{3\pm\delta} \qquad (I)$$

where each of A and A', independently, is a rare earth or alkaline earth metal, x is in the range of 0 to 1, each of B and B', independently, is a transition metal, y is in the range of 0 to 1, and δ is in the range of 0 to 1. δ can represent the average number of oxygen-site vacancies (i.e., −δ) or surpluses (i.e., +δ); in some cases, δ is in the range of 0 to 0.5, 0 to 0.25, 0 to 0.15, 0 to 0.1, or 0 to 0.05. For clarity, it is noted that in formula (I), B and B' do not represent the element boron, but instead are symbols that each independently represent a transition metal. In some cases, δ can be approximately zero, i.e., the number of oxygen-site vacancies or surpluses is effectively zero. The material can in some cases have the formula $AB_yB'_{1-y}O_3$ (i.e., when x is 1 and δ is 0); $A_xA'_{1-x}BO_3$ (i.e., when y is 1 and δ is 0); or $ABO_3$ (i.e., when x is 1, y is 1 and δ is 0).

Rare earth metals include Sc, Y, La, Ce, Pr, Nd, Pm, Sm, Eu, Gd, Tb, Dy, Ho, Er, Tm, Yb, and Lu. Alkaline earth metals include Be, Mg, Ca, Sr, Ba, and Ra. Transition metals include Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, and Hg. Particularly useful rare earth metals can include La. Particularly useful alkaline earth metals can include Ca, Sr, and Ba. Particularly useful transition metals can include first-row transition metals, for example, Cr, Mn, Fe, Co, Ni, and Cu. Representative materials of formula (I) include $LaCrO_3$, $LaMnO_3$, $LaFeO_3$, $LaCoO_3$, $LaNiO_3$, $LaNi_{0.5}Mn_{0.5}O_3$, $LaCu_{0.5}Mn_{0.5}O_3$, $La_{0.5}Ca_{0.5}MnO_{3-\delta}$, $La_{0.5}Ca_{0.5}FeO_{3-\delta}$, $La_{0.75}Ca_{0.25}FeO_{3-\delta}$, $La_{0.5}Ca_{0.5}CoO_{3-\delta}$, $LaMnO_{3+\delta}$, and $Ba_{0.5}Sr_{0.5}Co_{0.8}Fe_{0.2}O_{3-\delta}$.

Filling of transition-metal or transition-metal-oxygen hybrid orbitals of $e_g$ symmetry parentage on the catalyst surface can serve as an activity descriptor of the intrinsic ORR activity for a large number of perovskite-based oxides.

In this regard, see Suntivich, J., et al., *Nature Chem.* 3, 546-550 (2011), which is incorporated by reference in its entirety.

Occupancy of cation orbitals of $e_g$ symmetry parentage can also serve as a descriptor of the intrinsic OER activity. However, the surface $e_g$ filling for the maximum intrinsic OER activity is different from that for ORR. This demonstrates the importance of Fermi energy pinning at the top of the O-2p bands in facilitating charge transfer between the catalyst and adsorbed or chemisorbed species. This principle has been applied in the design of OER electrocatalysts with an intrinsic OER activity higher than that of $IrO_2$.

EXAMPLES

Experimental

Material Synthesis. The perovskites samples were synthesized with either a co-precipitation method or a nitrate combustion method. For both methods, rare earth and alkaline earth nitrates and transition-metal nitrates (all 99.98% Alfa Aesar) in a 1:1 mole ratio were mixed in Milli-Q water (18 MΩ·cm) at 0.2 M metal concentration. For the co-precipitation method, the solution was titrated to 1.2 M tetramethylanunonium hydroxide (100% Alfa Aesar). The precipitate was filtered, collected, and dried. For the combustion method, glycine (>99% Sigma-Aldrich) was added to the solution at a 1:2 glycine to nitrate salt weight ratio. The resulting solution was heated until it vigorously evaporated, at which point, the solution emitted sparks as a result of combustion. The samples were subjected to heat treatment at 1,000° C. under Ar atmosphere for the $La_{1-x}Ca_xMnO_3$ (x=0, 0.5) and $La_{0.5}Ca_{0.5}CrO_3$, $LaNi_{0.5}Mn_{0.5}O_3$ and $LaCu_{0.5}Mn_{0.5}O_3$ samples, at 1000° C. under dry air atmosphere for $LaCrO_3$, $La_{1-x}Ca_xFeO_3$ (x=0, 0.25, 0.5), $La_{1-x}Ca_xCoO_3$ (x=0, 0.5) samples, at 800° C. under $O_2$ atmosphere for the $LaNiO_3$ sample, and at 1,100° C. under air atmosphere for BSCF. $LaMnO_{3+\delta}$ was prepared from an 800° C. heat treatment of $LaMnO_3$ in air. All gases had ultra-high-grade purity (Airgas). All samples were characterized by X-ray diffraction. Average particle sizes with standard deviations and estimated surface area values were quantified via scanning electron microscopy. Table 2 summarizes certain properties of the oxides studied. The number averaged diameter, $d_{number}$, the volume-area averaged diameter, $d_{v/a}$, and the specific surface area, $A_s$. were obtained from particle size distribution measurements. Methods for calculating each variable can be found in, e.g., Suntivich, J., Gasteiger, H. A., Yabuuchi, N., & Shao-horn, Y., *J. Electrochem. Soc.* 157, B1263-B1268 (2010), which is incorporated by reference in its entirety.

TABLE 2

|  | $d_{number}$ (μm) | $d_{v/a}$ (μm) | $A_s$ (m$^2$ g$^{-1}$) |
| --- | --- | --- | --- |
| $LaCrO_3$ | 0.64 (±0.25) | 0.83 | 1.1 |
| $LaMnO_3$ | 1.05 (±0.52) | 1.51 | 0.6 |
| $LaFeO_3$ | 0.71 (±0.34) | 1.01 | 0.9 |
| $LaCoO_3$ | 0.78 (±0.40) | 1.10 | 0.7 |
| $LaNiO_3$ | 0.20 (±0.06) | 0.24 | 3.5 |
| $LaNi_{0.5}Mn_{0.5}O_3$ | 0.34 (±0.11) | 0.81 | 1.1 |
| $LaCu_{0.5}Mn_{0.5}O_3$ | 0.58 (±0.28) | 0.80 | 1.1 |
| $La_{0.5}Ca_{0.5}MnO_{3-\delta}$ | 0.92 (±0.44) | 0.62 | 2.1 |
| $La_{0.5}Ca_{0.5}FeO_{3-\delta}$ | 0.62 (±0.31) | 0.89 | 1.1 |
| $La_{0.75}Ca_{0.25}FeO_{3-\delta}$ | 0.36 (±0.22) | 0.59 | 1.8 |
| $La_{0.5}Ca_{0.5}CoO_{3-\delta}$ | 0.43 (±0.23) | 0.63 | 1.6 |
| $LaMnO_{3+\delta}$ | 1.39 (±0.58) | 1.81 | 0.5 |

TABLE 2-continued

|  | $d_{number}$ (μm) | $d_{v/a}$ (μm) | $A_s$ (m$^2$ g$^{-1}$) |
| --- | --- | --- | --- |
| $Ba_{0.5}Sr_{0.5}Co_{0.8}Fe_{0.2}O_{3-\delta}$ (as-synthesized) | 0.84 (±1.27) | 7.01 | 0.2 |
| $Ba_{0.5}Sr_{0.5}Co_{0.8}Fe_{0.2}O_{3-\delta}$ (ball-milled) | 0.23 (±0.09) | 0.30 | 3.9 |

Electrode preparation. Glassy-carbon electrodes were polished with 0.05 μm alumina slurry to obtain a mirror finish. Perovskite oxides can be mixed with acid-treated acetylene black at a mass ratio of 5:1. Catalyst ink was prepared by mixing perovskite oxides with or without acetylene black with tetrahydrofuran (THF) and an appropriate amount of neutralized Nafion (5% weight). In one instance, the electrode had a final composition of 250 $\mu g_{oxide}$ cm$^{-2}_{disk}$, 50 $\mu g_{AB}$ cm$^{-2}_{disk}$, and 50 $\mu g_{Nafion}$ cm$^{-2}_{disk}$.

Electrochemical characterization. In one instance, electrochemical measurements were conducted with a rotating-disk electrode in a 100 mL solution of 0.1 M KOH prepared from Milli-Q water (18 MΩ·cm) and KOH pellets electrolyte with a potentiostat. All measurements were collected under $O_2$ saturation at a rotation rate of 1600 rpm, where no mass transport limitation was observed and hence no transport correction was applied. In this example, error bars represent standard deviations from at least three independent repeat measurements whereby the change in activity over subsequent potential cycles was less than 3%. The analysis of OER kinetic currents were taken as the average between positive and negative going scans, and the specific OER activity was obtained from normalizing the kinetic current by the surface area of each oxide estimated from electron micrographs (see Suntivich, J., et al., *J. Electrochem. Soc.* 157, B1263-B1268 (2010), which is incorporated by reference in its entirety).

Calculation of the specific and mass activity of $Ni_2CoO_4$, $IrO_2$, and $RuO_2$ catalysts. The specific and mass activities of $Ni_2CoO_4$ were calculated from references. Only the highest values from literature that had both iR corrections and surface area information were used. OER activities of homemade $IrO_2$ and $RuO_2$ were also measured. A summary of the activity values is listed in Table 1 above.

Determination of $e_g$ filling of Ca-substituted $La_{0.5}Ca_{0.5}CoO_{3-\delta}$. Because the exact spin-state of $La_{0.5}Ca_{0.5}CoO_{3-\delta}$ has not been determined yet in the literature, partly due to the fact that the majority of Co remains 3+ despite the substitution of $La^{3+}$ by $Ca^{2+}$ ion (see Mastin, J., Einarsrud, M. A., & Grande, T. *Chem. Mat.* 18, 1680 (2006), which is incorporated by reference in its entirety,) the spin state of this compound was approximated as a mixture of $LaCoO_3$ and $SrCoO_{2.5}$. Using a mixture of intermediate spin $LaCoO_3$ ($t_{2g}^5 e_g^1$, see Yan, J. Q., Thou, J. S., & Goodenough, J. B., *Phys. Rev. B* 70, 014402 (2004), which is incorporated by reference in its entirety,) and high spin $SrCoO_{2.5}$ ($t_{2g}^4 e_g^2$, Takeda, T., Watanabe, H., & Yamaguch. Y., *J. Phys. Soc. Jpn.* 33, 970 (1972), which is incorporated by reference in its entirety,) the approximation was $e_g \approx 1.5$ for $La_{0.5}Ca_{0.5}CoO_{3-\delta}$. The concept of high-spin Co stabilization with Ca-substitution has been proposed in the literature (see Samoilov, A. V. et al., *J. Appl. Phys.* 83, 6998 (1998) and Samoilov, A. V. et al., *Phys. Rev. B* 57, 14032 (1998), each of which is incorporated by reference in its entirety,) so the approximation is within reason, especially for the surface Co. TGA confirmed the formation of oxygen vacancy ($\delta_{TGA}$=0.21±0.01) that had been reported in the literature following Ca-substitution. Co K-edge X-ray Absorption Spectroscopy (XANES) additionally demonstrated that the Co edge remained unchanged following Ca-substitution, which provided further evidence for the stabilization of $Co^{3+}$ in $La_{0.5}Ca_{0.5}CoO_{3-\delta}$.

Figure 2:
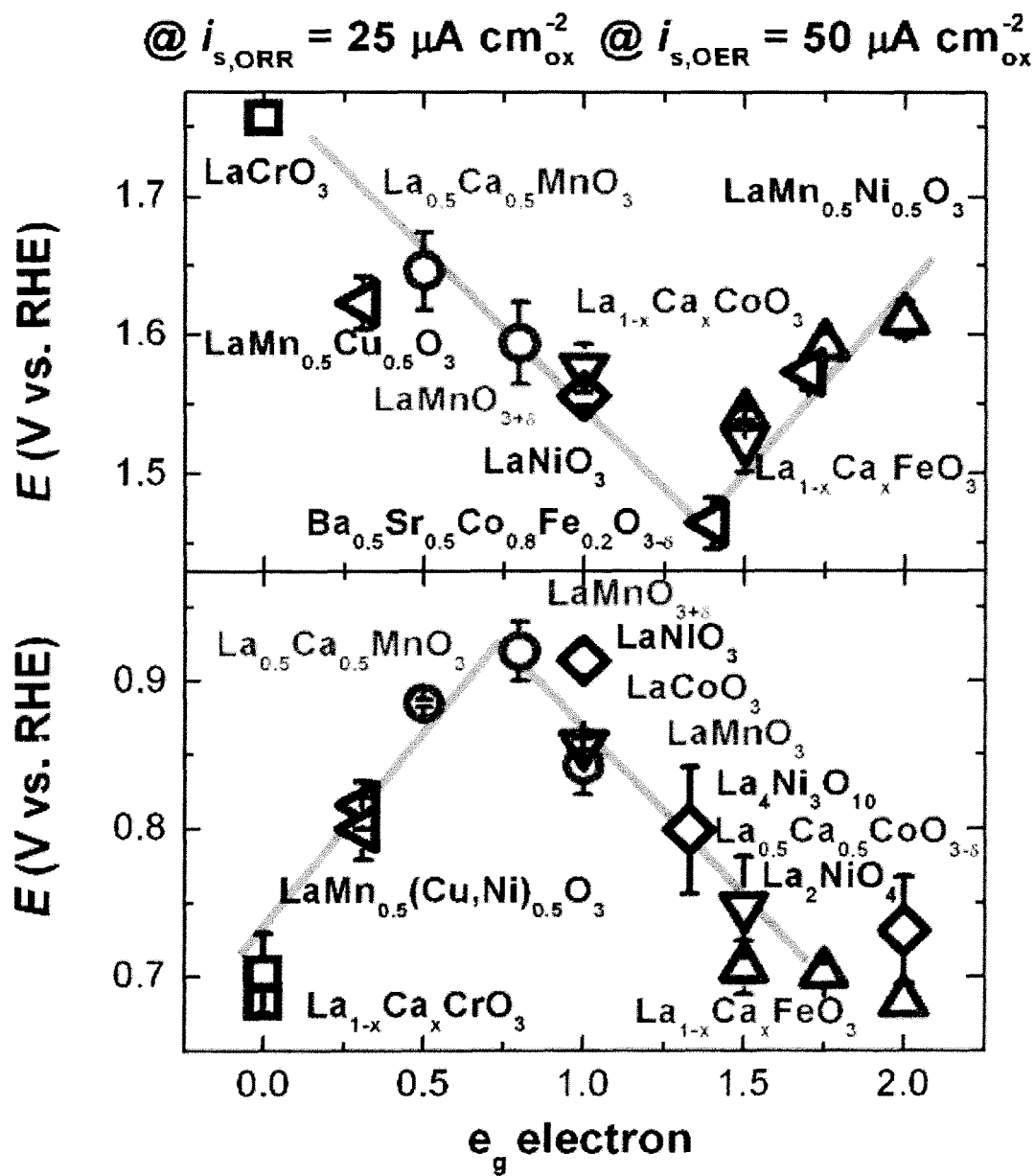
FIG. 2 is a pair of graphs showing extent of $e_g$ orbital filling of surface active transition-metal ions versus activity for a variety of perovskite catalysts for the OER (upper panel) and the ORR (lower panel). Activity is expressed as the overpotential required to give an intrinsic activity ($i_s$) of 50 µA cm$^{-2}_{ox}$ for the OER and 50 µA cm$^{-2}_{ox}$ for the ORR.

Determination of $e_g$ filling of $LaNi_{0.5}Mn_{0.5}O_3$ and $LaCu_{0.5}Mn_{0.5}O_3$. The $e_g$ fillings for the $LaNi_{0.5}Mn_{0.5}O_3$ and $LaCu_{0.5}Mn_{0.5}O_3$ were complicated by the presence of two inequivalent B atoms and thus two different $e_g$ fillings. It has been previously demonstrated that these compounds undergo charge-disproportionation into $Mn^{4+}$ and $Ni^{2+}/Cu^{2+}$, where the $e_g$ fillings were estimated using XANES. Using a known relationship where $E_0$ (maximum inflection point of the absorption edge) scales with oxidation state (see Arcon, I., Mirtic, B., & Kodre, A., *J. Am. Ceram. Soc.* 81, 222-224 (1998), which is incorporated by reference in its entirety), the Mn electronic configuration to be $t_{2g}^3 e_g^{0.3}$ for both $LaNi_{0.5}Mn_{0.5}O_3$ and $LaCu_{0.5}Mn_{0.5}O_3$, and Ni to be $t_{2g}^6 e_g^{1.7}$ for $LaNi_{0.5}Mn_{0.5}O_3$ and Cu to be $t_{2g}^6 e_g^{2.7}$ for $LaNi_{0.5}Mn_{0.5}O_3$. When the $e_g$ filling from either Mn or Ni (Cu) was applied to the volcano plot, it was found that the use of $e_g$ fillings from Ni and Mn was most consistent with the observed activity for $LaNi_{0.5}Mn_{0.5}O_3$ and $LaCu_{0.5}Mn_{0.5}O_3$ respectively (FIG. 2). Had the $e_g$ filling of average B atoms, or Mn for $LaNi_{0.5}Mn_{0.5}O_3$ or Cu for $LaCu_{0.5}Mn_{0.5}O_3$, been used, underestimation of the OER activity would have resulted. The consistency of $e_g$ filling selection with the volcano plot also led to a proposal that the active site was the Ni atom for $LaNi_{0.5}Mn_{0.5}O_3$ or Mn atom for $LaCu_{0.5}Mn_{0.5}O_3$, where the Mn atom in $LaNi_{0.5}Mn_{0.5}O_3$ has too little $e_g$ electron filling and Cu atoms in $LaCu_{0.5}Mn_{0.5}O_3$ has too many $e_g$ electrons, rendering their catalytic properties less active.

The $e_g$ filling of $Ba_{0.5}Sr_{0.5}Co_{0.8}Fe_{0.2}O_{3-\delta}$ compound was similarly complicated by the presence of four distinct cations and a large array of oxygen vacancy inside the host structure. The oxygen vacancy concentration was measured using thermogravimetry (TGA), where $\delta_{TGA}$ was yielded to be ~0.4. While this $\delta$ is in agreement with the literature value (see Jung, J., Misture, S. T., & Edwards, D. D., *Solid State Ionics* 181, 1287-1293 (2010), which is incorporated by reference in its entirety), it alone still could not determine the oxidation state of Co and Fe atoms. Therefore the previous works of Harvey et al. and Arnold et al. (see Harvey, A. S. et al., *Phys. Chem. Chem. Phys.* 11, 3090-3098 (2009) and Arnold, M., Xu, Q., Tichelaar, F. D., & Feldhoff, A., *Chem. Mat.* 21, 635-640 (2009), each of which are incorporated by reference in its entirety), whose X-ray Absorption Spectroscopy and X-ray Photoemission Spectroscopy studies have shown that the Co oxidation state in BSCF was partially reduced below 3+ and that the Fe oxidation state is partially oxidized above 3+, were resorted to estimate the $e_g$ filling instead. Since the surface Co state in BSCF has been reported to be in intermediate spin state, similar to the case of $LaCoO_3$ (see Harvey, A. S. et al., *J. Phys.-Condes. Matter* 21, 10 (2009), which is incorporated by reference in its entirety), the electronic configuration Co in BSCF is likely $t_{2g}^5 e_g^{>1}$, whereas the electronic configuration in Fe is likely $t_{2g}^3 e_g^{<2}$. When the $e_g$ filling from either Co or Fe was applied to the volcano plot, the use of $e_g$ fillings from Co (assuming to be ranging around $t_{2g}^5 e_g^{~1.2}$) was found to be most consistent with the observed activity of the BSCF (FIG. 2, upper panel). Had the $e_g$ filling of average B atoms or Fe (likely to be the range of $e_g$~1.5-2) been used, the $e_g$ would have resulted in an underestimation of the OER activity. While the absolute accuracy the $e_g$ filling of the Co atom in BSCF is not known, the prior knowledge of the Co state in this compounds narrows down its $e_g$ filling within the range of 1.2. Had either 1.1 or 1.3 been used, the trend would still hold and the conclusion of this example would still be valid.

Results and Discussion

Figure 1B:
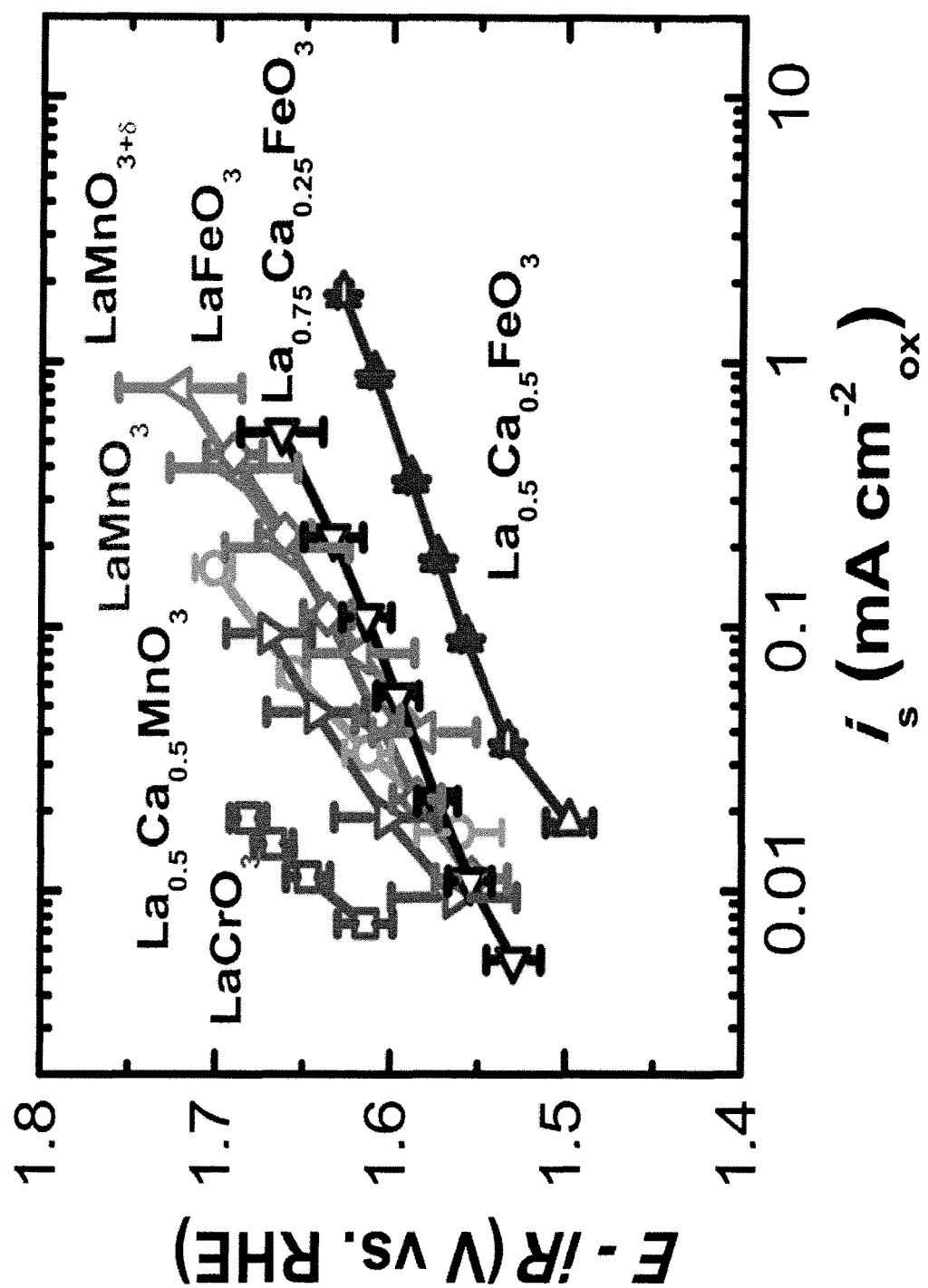
FIG. 1B-C are graphs showing intrinsic OER activity of all the oxides examined as a function of current density.
Figure 1C:
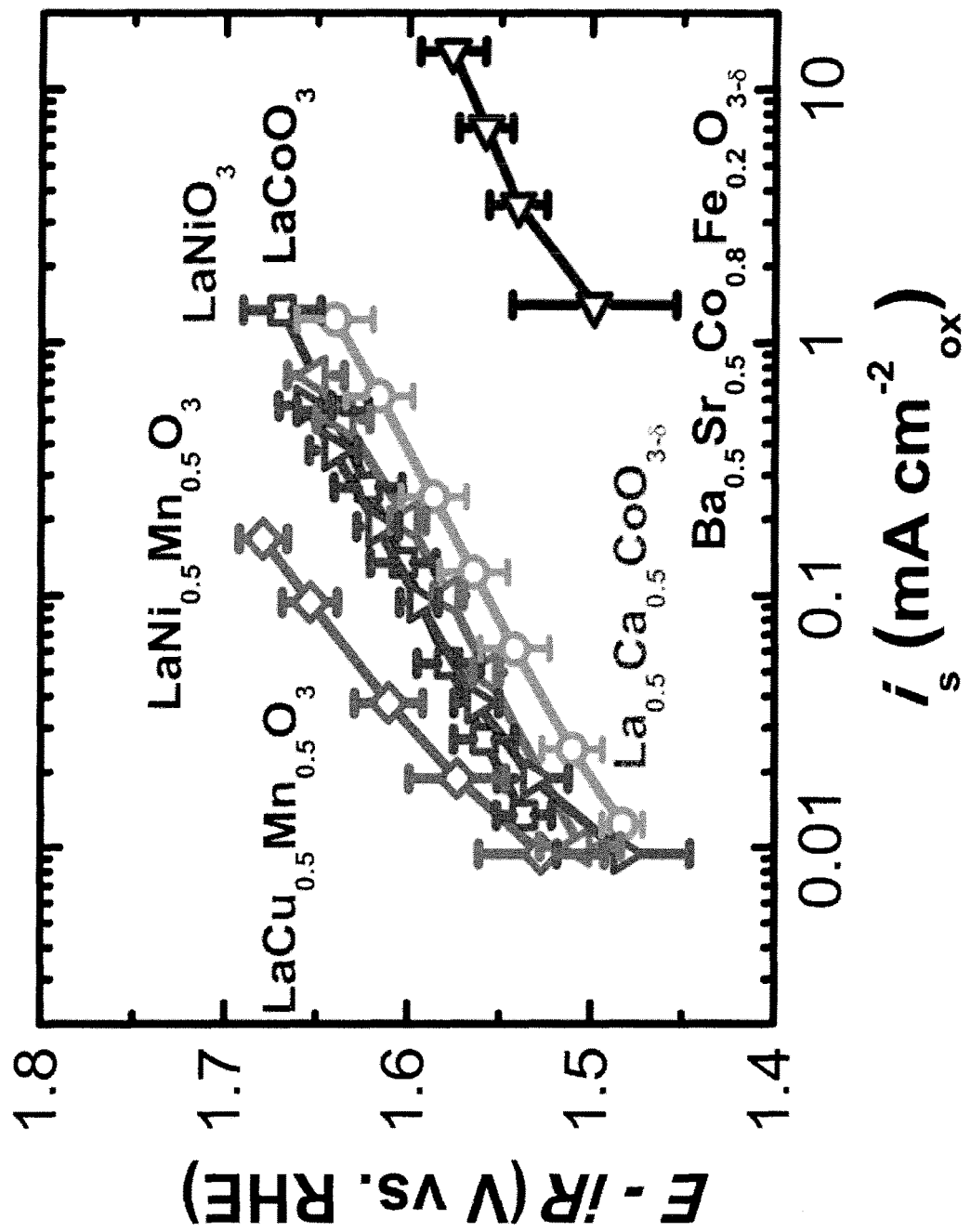

The electrocatalytic OER activity of different transition-metal oxides was measured using thin-film rotating-disk electrodes with well-defined oxygen transport (see Suntivich, J., et al., *J. Electrochem. Soc.* 157, B1263-B1268 (2010), which is incorporated by reference in its entirety). Examples of the OER activity of oxides are shown in FIG. 1A, where the OER currents were capacity corrected by taking an average of the positive and negative scans. Background anodic currents deriving from either a glassy carbon (GC) substrate or a substrate with carbon additive (acetylene black, AB) are also shown in the same figure, indicating that the background contribution from GC and AB was negligible below ~1.7 V vs. RHE. The potential cycling window was therefore limited to between 1 and 1.7 V vs. RHE to minimize the influence of background currents on the OER measurement. In this range, the onset potentials of the OER for electrodes with $LaCoO_3$ and $La_{0.5}Ca_{0.5}CoO_{3-\delta}$ were significantly lower than that of the substrate with AB, which indicated that the oxides have a much higher OER activity than AB. To assess the intrinsic OER activity for the perovskite oxides, the surface-area-normalized kinetic current density, referred to as intrinsic or specific activity ($i_s$), was calculated. The intrinsic OER activity of all the oxides examined are shown in FIG. 1B-C.

This thin-film RDE method consistently yielded a comparable or higher specific intrinsic OER activity of oxides than that estimated from other data (see Table 3 and Bockris, J. O. & Otagawa, T., *J. Electrochem. Soc.* 131, 290-302 (1984); Matsumoto, Y., Manabe, H., & Sato, E., *J. Electrochem. Soc.* 127, 811-814 (1980); Wattiaux, A., Grenier, J. C., Pouchard, M., & Hagenmuller, P., *J. Electrochem. Soc.* 134, 1714-1718 (1987); and Matsumoto, Y. & Sato, E., *Electrochim. Acta* 24, 421-423 (1979); each of which is incorporated by reference in its entirety). The higher intrinsic OER activity in this study relative to previous studies can be attributed to a more accurate determination of the intrinsic OER activity than that estimated from the data reported previously because of uniform catalyst utilization in thin-film electrodes (<10 $cm^2_{ox}/cm^2_{disk}$), which was difficult to achieve with previous electrodes having a very high internal surface area (~$10^3$ $cm^2_{ox}/cm^2_{disk}$). See, for example, Suntivich, J., et al., *J. Electrochem. Soc.* 157, B1263-B1268 (2010); and Schmidt, T. J. et al., *J. Electrochem. Soc.* 145, 2354-2358 (1998); each of which is incorporated by reference in its entirety.

TABLE 3

| Compounds (reference) | Electrode i (mA $cm^{-2}_{disk}$) | Loading (mg $cm^{-2}_{disk}$) | Mass i (A $g^{-1}$) | Specific i (μA $cm^{-2}_{ox}$) |
|---|---|---|---|---|
| $LaNiO_3$ (Bockris & Otagawa) | ~20-2,000 (extrapolated) | n.a. | n.a. | 30-400 (extrapolated) |
| $La_{1-x}Sr_xCoO_3$ (Bockris & Otagawa) | ~2-30 | n.a | n.a | ~8-25 |

TABLE 3-continued

| Compounds (reference) | Electrode i (mA cm$^{-2}_{disk}$) | Loading (mg cm$^{-2}_{disk}$) | Mass i (A g$^{-1}$) | Specific i (μA cm$^{-2}_{ox}$) |
|---|---|---|---|---|
| La$_{1-x}$Sr$_x$FeO$_3$ (Bockris & Otagawa) | ~2-10 | n.a | n.a | 3 |
| La$_{1-x}$Sr$_x$MnO$_3$ (Bockris & Otagawa) | ~0.1-1 | n.a | n.a | 0.2-1 |
| La$_{1-x}$Sr$_x$CoO$_3$ (Matsumoto et al.) | ~3-10 | n.a | n.a | n.a. |
| La$_{1-x}$Sr$_x$FeO$_3$ (Wattiaux et al.) | ~0.1-2.5 | n.a | n.a | n.a. |
| La$_{1-x}$Sr$_x$MnO$_3$ (Matsumoto & Sato) | ~0.2-0.6 | n.a | n.a | n.a. |
| LaNiO$_3$ (this work) | ~3.5 | 0.25 | ~14 | ~370 |
| La$_{1-x}$Ca$_x$CoO3 (this work) | ~0.5-3 | 0.25 | ~2-15 | ~250-800 |
| La$_{1-x}$Ca$_x$FeO$_3$ (this work) | ~0.2-4 | 0.25 | ~0.8-16 | ~90-1,500 |
| La$_{1-x}$Ca$_x$MnO$_3$ (this work) | ~0.03-0.4 | 0.25 | ~0.12-1.6 | ~20-100 |
| BSCF (this work) | ~23 | 0.25 | ~240 | ~20,000 |

The intrinsic OER activities of all oxide catalysts were compared in terms of the overpotential required to provide 50 μA/cm$^2_{ox}$ of specific activity and then correlated with the surface $e_g$ filling of the active transition-metal ions. Remarkably, a volcano plot for the OER with respect to the surface $e_g$ filling (FIG. 2, top panel), spanning ~0.3V, which corresponds to a change in 4 orders of magnitude in the intrinsic OER activity, was observed. Because surface $e_g$ filling of the active transition-metal ions was also identified as the ORR activity descriptor (see FIG. 2, lower panel, and Suntivich, J., et al., *Nature Chem.* 3, 546-550 (2011), which is incorporated by reference in its entirety), the $e_g$ activity descriptor must exert the influence on the catalytic activity via the binding of oxygen. This is similar to what has been suggested by ab initio studies, which have shown dependence of both the OER and the ORR on the oxygen binding strength (see Rossmeisl, J., Qu, Z. W., Zhu, H., Kroes, G. J., & Norskov, J. K., *J. Electroanal. Chem.* 607, 83-89 (2007), which is incorporated by reference in its entirety). This is not surprising since the symmetry of the $e_g$ electron in an octahedral environment is antibonding with respect to the B—O interaction. Too little of $e_g$ filling results in B—O bonding that is too strong, while too much $e_g$ filling leads to an interaction that is too weak. As a result, a moderate amount of $e_g$-filling (~1.2) yields the highest activity. In view of these studies, the observation of a volcano relationship with $e_g$ orbital filling for both reactions strongly supported the hypothesis that $e_g$ filling of surface transition-metal ions is related to the binding of oxygen at the oxide surface. Thus, $e_g$ filling can serve as a universal material property to describe electrocatalysis of both the OER and the ORR on oxide materials.

It should be noted that the $e_g$-filling descriptor is fundamentally different from the influence of the number of 3d electron on the B—O bond strength (see, e.g., Bockris, J. O. & Otagawa, T., *J. Electrochem. Soc.* 131, 290-302 (1984), which is incorporated by reference in its entirety). Filling of the surface transition-metal antibonding states of $e_g$-symmetry orbital parentage, together with positioning of the catalyst Fermi energy relative to the top of the O-2p bands, is more appropriate. This is because the occupancy of the σ-bonding vs. π-bonding orbitals at the surface can differ from in the bulk (Yan, J. Q., Zhou, J. S., & Goodenough, J. B., *Phys. Rev. B* 70, 014402 (2004), which is incorporated by reference in its entirety); and because the surface σ-bonding orbitals have a stronger overlap integral with the adsorbate than do π-bonding orbitals, promoting electron transfer between surface cations and adsorbed molecular species (Suntivich, J., et al., *Nature Chem.* 3, 546-550 (2011), which is incorporated by reference in its entirety). In other words, the $e_g$ filling of surface transition-metal ions is a more appropriate descriptor of activity than d-electron filling of bulk transition-metal ions, as the former differentiates the stronger interaction of direct σ bonding of an $e_g$ symmetry state with reaction intermediates from the weaker interaction of the π bonding having $t_{2g}$ symmetry.

Figure 5:
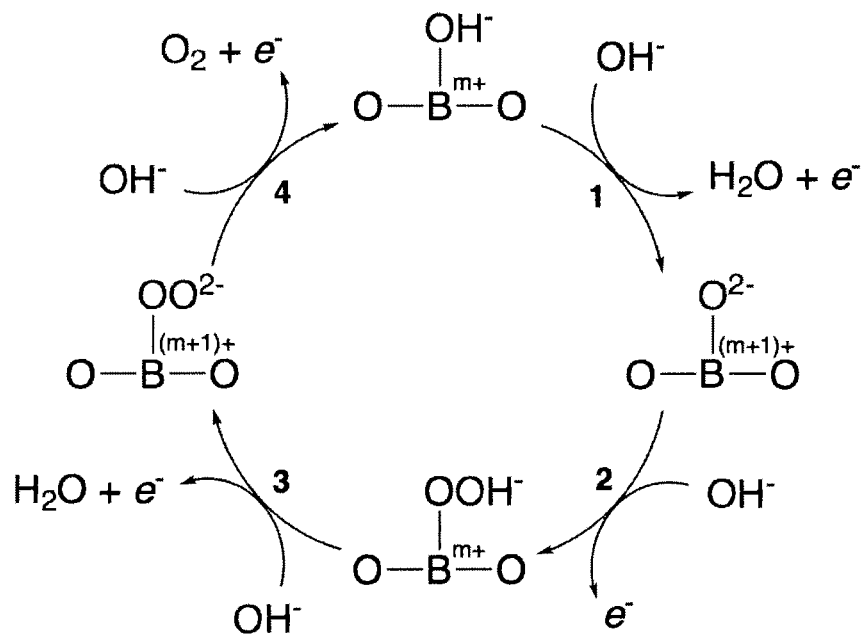
FIG. 5 is a schematic illustration of a proposed mechanism for the OER on perovskite oxide catalysts. The OER proceeds via four steps: 1, surface oxo formation; 2, O—O bond formation; 3, oxyhydroxide deprotonation; and 4, surface hydroxide displacement.

The crucial insight to the OER and its synergy with the ORR mechanism came from the observation that the maximum intrinsic OER activity falls at approximately an $e_g$-filling ~1.2, whereas the maximum intrinsic ORR activity occurred at $e_g$~0.8 (see FIG. 2). Two important points were derived from this observation: first was the non-matching peaks of the OER/ORR volcanoes and second was the importance of single $e_g$ for OER/ORR electrocatalysis. The non-matching peaks of the OER and the ORR volcanoes were a result of the rate determining step (RDS) difference between the OER and the ORR, which suggested that the best OER catalyst cannot be effective for the ORR as these two reactions are limited by different steps (see Rossmeisl, J., Qu, Z. W., Thu, H., Kroes, G. J., & Norskov, J. K., *J. Electroanal. Chem.* 607, 83-89 (2007), which is incorporated by reference in its entirety). The RDS for the OER was proposed to be the O—O bond formation (FIG. 5, step 2) for the right branch of the volcano ($e_g$>1.2) and the deprotonation of the oxy-hydroxide group (FIG. 5, step 3) for the left branch of the volcano ($e_g$<1.2). Note that these OER RDS are distinct from the ORR RDS, which have been proposed previously to be the $O_2^{2-}$/OH$^-$ displacement for the right branch of the volcano ($e_g$>0.8) and the surface OH$^-$ regeneration for the left branch ($e_g$<0.8, see Suntivich, J., et al., *Nature Chem.* 3, 546-550 (2011), which is incorporated by reference in its entirety). Having $e_g$ close to 1 (≈1.2) can allow the oxide catalyst to facilitate both the O—O bond formation and the deprotonation of the oxy-hydroxide group efficiently. Without wishing to be bound to a particular theory, the origin of the OER volcano and the asymmetry of the OER and the ORR volcanoes of FIG. 2 can be explained by the detailed molecular mechanisms discussed below for each reaction on an oxide surface. For the O—O bond formation from $B^{(m+1)+}$—$O^{2-}$+OH$^-$→$B^{(m)+}$—OOH$^-$+e$^-$, the bond-forming process uplifts the O $2p_x$ position by forming the O—O 2p σ* level, a success of which requires a charge withdrawal from O $2p_x$ by a predominantly empty $e_g$ orbital in $B^{(m+1)+}$ state, a condition that is satisfied only when $e_g<1$ at a starting $B^{(m+)}$ state. In the deprotonation of $B^{(m)+}$—OOH$^-$+OH$^-$→$B^{(m+1)+}$—$O_2^{2-}$+$H_2O$+$e^-$, the electrode must extracts an electron from B—O orbital and thus can only occur if $B^{(m+)}$ has more than one electron in its $e_g$ orbital to accommodate this charge transfer step. A failure of this criterion means that a charge removal must occur on the $O_2^{2-}$ 2p ($\pi^*$) instead of B, a process that is highly energetic as it forms an intermediate that is superoxide-like ($O_2^-$) radical.

Figure 3A:
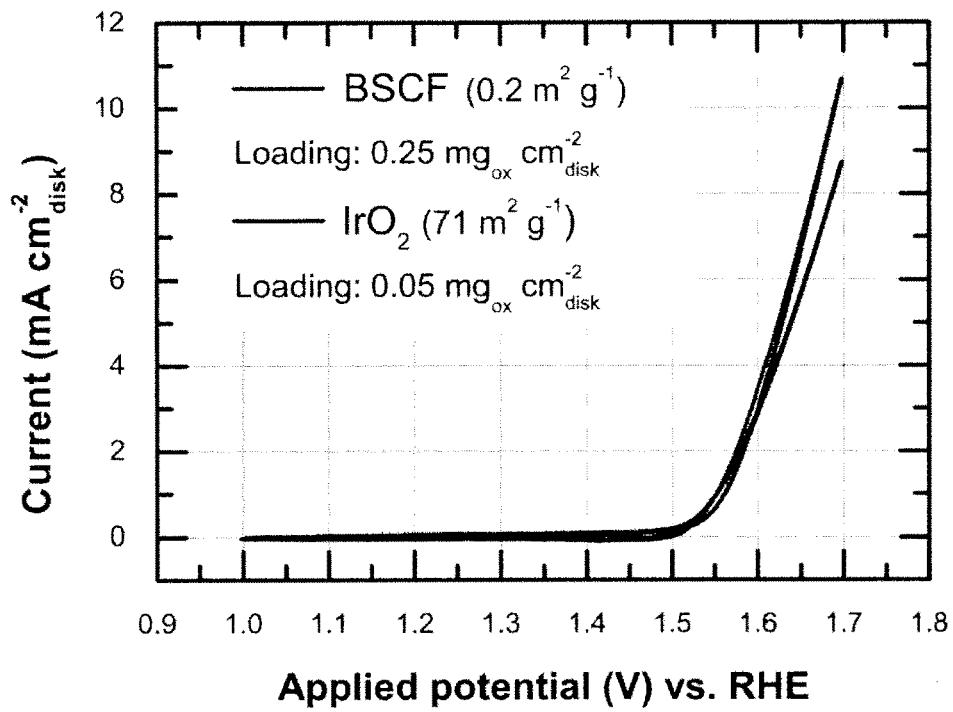
FIG. 3A is a graph depicting the dependence of geometric current density varies with applied voltage for the OER catalyzed by BSCF or IrO$_2$.
Figure 3B:
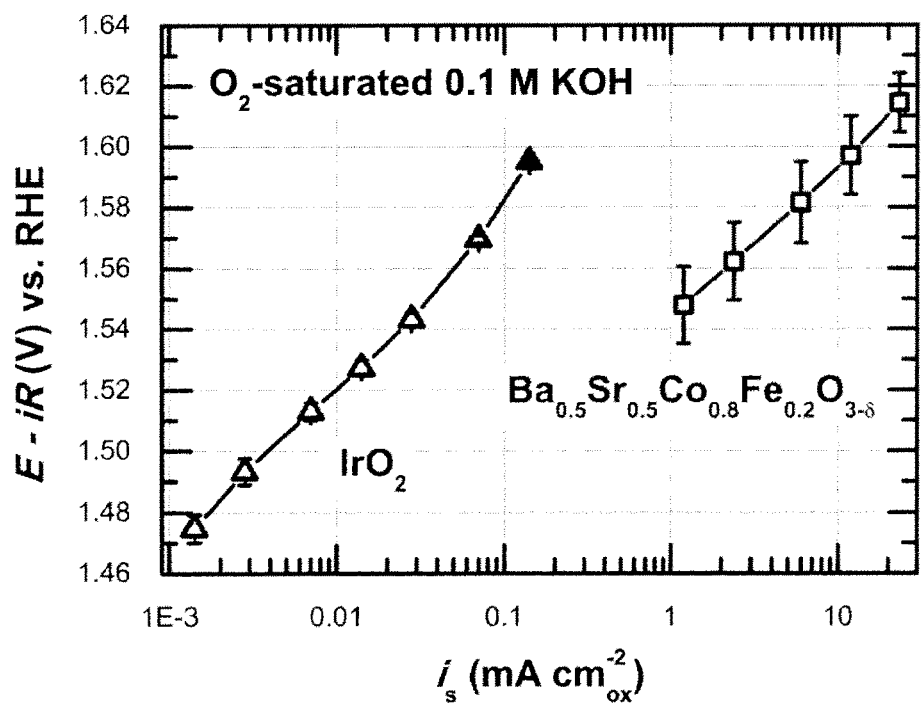
FIG. 3B is a graph showing intrinsic OER activity ($i_s$) of the same materials as a function of current density.
Figure 4:
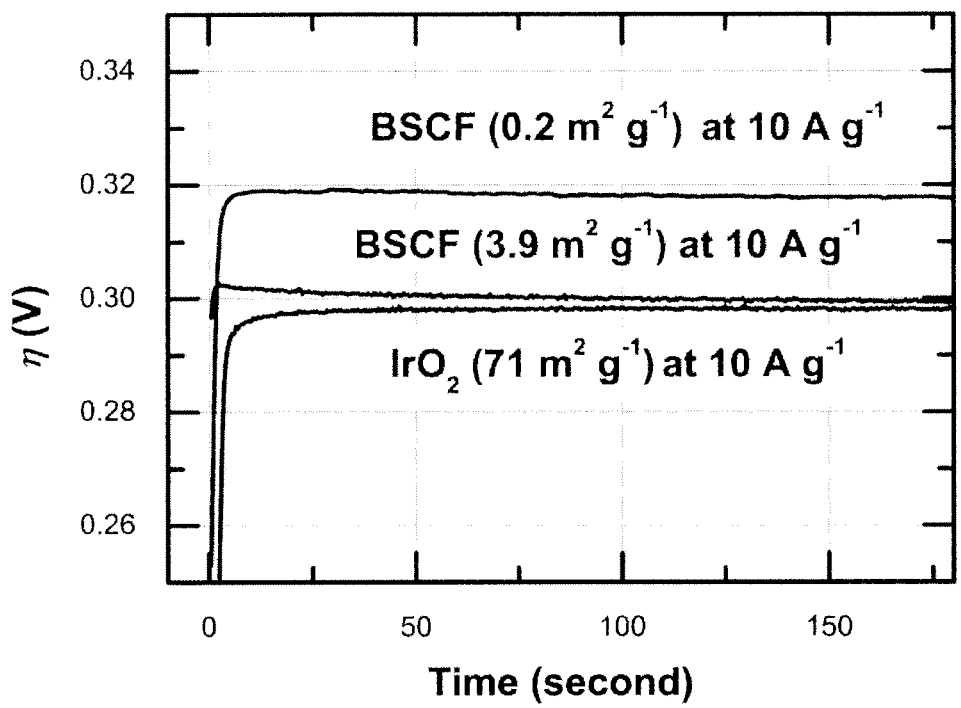
FIG. 4 is a graph plotting intrinsic OER activity BSCF, ball-milled BSCF, or IrO$_2$ over time during catalysis.

Based on the observed volcano relations, $e_g \approx 1.2$ was predicted to be important criterion for designing highly efficient OER electrocatalyst. One such perovskite that fulfils this criterion is $Ba_{0.5}Sr_{0.5}Co_{0.8}Fe_{0.2}O_{3-\delta}$ (BSCF). At room temperature, X-ray spectroscopy has revealed a charge transfer from Fe to Co, a process that results in a slight Co reduction (see Harvey, A. S. et al., *Phys. Chem. Chem. Phys.* 11, 3090-3098 (2009) and Arnold, M., Xu, Q., Tichelaar, F. D., & Feldhoff, A., *Chem. Mat.* 21, 635-640 (2009), both of which are incorporated by reference in its entirety). Because the surface Co of BSCF is in the intermediate spin state (see Harvey, A. S. et al., *J. Phys.-Condes. Matter* 21, 10 (2009), the electronic configuration of Co in BSCF was assigned to be $t_{2g}^5 e_g^{~1.2}$, a condition that satisfied the design criteria for OER. To validate this prediction, BSCF was synthesized using nitrate combustion method and its OER electrocatalytic activity evaluated. The performance of BSCF fit exactly into the volcano plots in FIG. 2, having the highest specific OER activity ever reported. Comparison against the OER electrocatalytic activity of $IrO_2$ nanoparticles showed the intrinsic OER activity of BSCF was at least 2 orders of magnitude superior (see FIG. 3A-B). On a mass basis, the OER activity of BSCF was competitive against $IrO_2$, especially once the size of the BSCF was reduced (via various size reduction strategies such as, but not limited to, ball-milling) to sub-micron range (FIG. 4). The OER activity of BSCF is further shown in FIG. 4, where the overpotential of BSCF was shown to be nearly identical to that of $IrO_2$, despite the $IrO_2$ surface area being orders of magnitude larger. This is not limited to BSCF, but can apply to all oxides that are designed to have occupancy of $\sigma^*$-interaction with a value close to 1.2.

Other embodiments are within the scope of the following claims.

What is claimed is:

1. A method of generating oxygen, comprising:
providing a voltage source electrically connected to a first electrode and a second electrode; and an alkaline electrolyte in contact with the first electrode and the second electrode;
determining an occupancy of a σ-bonding orbital of $e_g$ symmetry parentage as a guide for selecting a catalyst for the second electrode;
preparing a catalyst for the second electrode, the catalyst to have an occupancy of the σ-bonding orbital of $e_g$ symmetry parentage of B, B', or each of B and B', is in a range of 0.5 to 1.6 and a mass evolution reaction activity that is higher than that of $IrO_2$, the catalyst being selected from a group of compounds of formula (I): $A_xA'_{1-x}B_yB'_{1-y}O_{3+-\delta}$ (I)
wherein each of A and A', independently, is a rare earth or alkaline earth metal, x is in a range of 0 to 1, each of B and B', independently, is a transition metal, y is in a range of 0 to 1, and δ is in a range of 0 to 1;
measuring the catalyst's specific and mass oxygen evolution reaction activity, and
catalyzing the oxygen evolution reaction when an oxygen-generating voltage is applied across the first electrode and the second electrode; and
applying the oxygen-generating voltage across the first electrode and the second electrode.

2. The method of claim 1, wherein the catalyst includes a perovskite.

3. The method of claim 1, wherein A is Ba and A' is Sr.

4. The method of claim 3, wherein B is Co.

5. The method of claim 4, wherein B' is Fe.

6. The method of claim 5, wherein the catalyst has the formula $Ba_{0.5}Sr_{0.5}CO_{0.8}Fe_{0.2}O_{3-\delta}$.

7. The method of claim 1, wherein the occupancy of the σ-bonding orbital of $e_g$ symmetry parentage of B, B', or each of B and B', is in a range of 0.8 to 1.5.

8. The method of claim 1, wherein the occupancy of the σ-bonding orbital of $e_g$ symmetry parentage of B, B', or each of B and B', is approximately 1.2.

* * * * *